J. W. MORRIS.
PHOTOGRAPHIC SCREEN FOR HALF TONE WORK.
APPLICATION FILED JUNE 24, 1909.
1,161,824.
Patented Nov. 23, 1915.
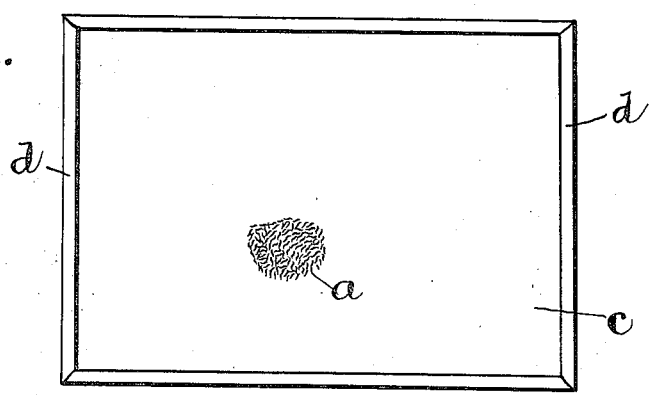
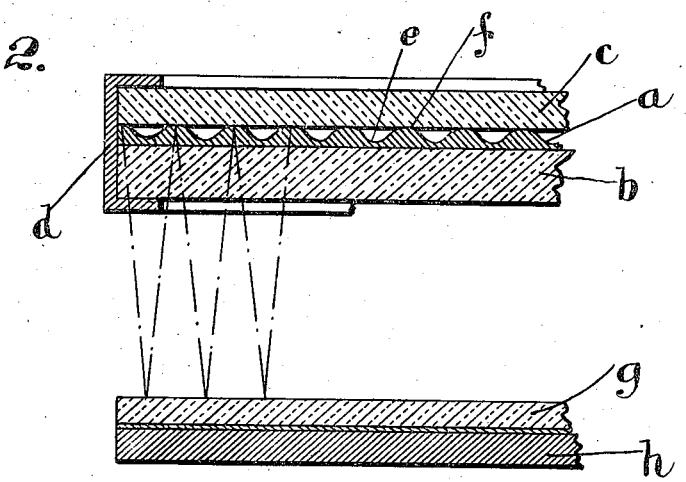

UNITED STATES PATENT OFFICE.

JAMES WILLARD MORRIS, OF NEW YORK, N. Y., ASSIGNOR TO THE SINPAR COMPANY, A CORPORATION OF NEW YORK.

PHOTOGRAPHIC SCREEN FOR HALF-TONE WORK.

1,161,824. Specification of Letters Patent. Patented Nov. 23, 1915.

Application filed June 24, 1909. Serial No. 503,983.

*To all whom it may concern:*

Be it known that I, JAMES WILLARD MORRIS, a citizen of the United States, residing at the borough of Manhattan, in the city, county, and State of New York, have invented certain new and useful Improvements in Photographic Screens for Half-Tone Work, of which the following is a specification, reference being had therein to the accompanying drawings, which form a part thereof.

My invention relates to photographic screens for half-tone work and more particularly to such screens as articles of manufacture.

In making half-tones in accordance with practices now generally followed in photo-engraving, the subject is first photographed upon an ordinary photographic plate and a negative developed. A positive, either upon an enlarged or a reduced scale, is then made from this negative and after retouching, a second negative plate, called a screened negative, is made by photographing with a screen interposed between the positive and the sensitized plate. From this screened negative the sensitized metallic plate is printed and developed prior to the acid etching. In all of these steps excepting when exposing the metallic plate a camera is used. For printing purposes the flat tones of the photograph must be interrupted in the negative to reproduce these tones upon the etched plate by means of dots, either black or white, making respectively inked surfaces and the indentations about same necessary in ordinary printing. At the present time this interruption of the tones upon the last negative is accomplished by means of a transparent plate having thereon fine, closely juxtaposed parallel lines extending at right angles to each other, which lines are opaque so as to intercept the light rays passing through the camera lens and said screen to the sensitized plate for the negative. The action of these rays upon said plate and upon the metallic plate when printed from the negative is identical with the ordinary photographic practice, or photographic art, setting the sensitizing agent upon the plate where the light penetrates and failing to set it where the light is obstructed by the lines upon the screen. This setting of the sensitizing agent in the preparation of the metallic plate permits the acid to etch away the surface of the plate only at those points where the said agent was not set, causing depressions resulting in white dots at such point on an impression made from the plate. The screens heretofore used have always possessed a well defined design which appears reproduced upon the negative and consequently upon the sensitized metal plate, and upon the prints taken therefrom; and furthermore this well defined design results in flatness in the prints, and a loss of that artistic effect desirable in high class work. To obviate this, the screens will sometimes have the lines very narrow and will run as high as 400 to the inch to secure a fine mesh and thus reduce as much as possible the prominence of the screen design upon the plate and the print taken therefrom.

In addition to the ruled screen above referred to, a glass screen known as the Metzograph screen is sometimes used. In this screen, the effective surface is formed into a plurality of depressions varying in size, so that the adjacent portions of the resist upon the plate to be etched vary in size. Hence when etching the plate, particularly for the high lights, the smaller dots etch entirely away with a resultant isolation of the larger dots in a manner to give a poor tone effect.

The main object of the invention is to provide a screen for half-tone work which will embody therein no set design and will reproduce upon the sensitized plate, a plurality of irregularly juxtaposed white and black spaces or dots to secure a suitable effect without any design whatever beyond the lights and shadows of the original itself. A further object is to provide a plate having a surface thereon composed of a plurality of juxtaposed minute lens-like formations in order that the said screen will have a lenticular effect upon the light rays at each point of penetration, and thus insure a well defined action of this light upon the sensitized plate and avoid that diffusion of the light which occurs when concentrated light rays are passing through a flat glass plate as in the present practice in photo-engraving. A still further object is to provide a screen which will of itself have a focal distance with relation to the sensitized plate. A still further object is to provide a screen which may be used in printing the sensitized plate by direct or parallel light rays as distinguished from such rays passing through an interposed lens. And a still further object is to provide a photographic screen which will not only simplify the process of photo-engraving, but will give improved artistic effects as compared with the products of practices now being commonly followed, through the strengthening of the lines in the reproduction, sharp contrasts in tones and a general atmosphere lending distance to the picture taken therefrom.

The invention consists primarily in a photographic screen for half-tone work, as an article of manufacture, embodying therein a transparent film composed of irregularly disposed adjoining dissimilar surfaces, the alternate surfaces having lens-like formation whereby the light rays falling thereon will be refracted into foci and a stippled effect will be produced upon a sensitized plate; and in such other novel features of construction and combination of parts as are hereinafter set forth and described and more particularly pointed out in the claims hereto appended.

Referring to the drawings, Figure 1 is a view of the top of a screen plate, a portion of the surface thereof having indicated thereon the character of the film, only a portion of the surface showing this film, however, and Fig. 2 is a cross section of a portion of the screen showing it arranged within focal distance of a sensitized plate, the film being shown upon a greatly magnified scale and approximating its cross-section, as seen through a powerful microscope, the refraction and concentration of the light rays being indicated in dotted lines.

Like letters refer to like parts in both of said views.

My improved photographic screen, as illustrated in the accompanying drawings, consists of a transparent or translucent surface *a* preferably formed of a film mounted or deposited upon a transparent support, as plate of glass *b*. This glass is used solely as a protecting medium for the film and it is not my intention to limit the invention in its broader aspects to the use of a plate of glass, it being apparent that under some conditions the film *a* alone may be used. Opposed to the plate *b* is a second plate *c* protecting the other side of the film. The edges of the two plates *b c* may be secured in any desired manner as by the passe-partout strip *d*.

This film *a* is composed of gelatinous material which I subject to an astringent having the effect of contracting the mass of the material to form a plurality of closely juxtaposed adjoining surfaces, the said surfaces being alternately concave as at *e* and convex as at *f* and the concave and convex surfaces being formed by a reverse curve so as to eliminate angles, and cause the light falling within any convexity presented toward it to be gathered and focused by that portion of the surface, thus permitting the concentration of the light rays upon the sensitized plate only at points in alinement with the convex surfaces presented toward the light. The alternate surfaces, presenting each plane surface toward the light and a plane surface toward the sensitized plate will serve merely to diverge the light to the adjoining foci, and obstruct the passage of any light through that point upon the sensitized plate. The concavities in the film, form plano-concave lenses which serve to diverge the light rays to focus with the rays through the adjoining plano-convex surfaces, thus permitting the use of the screen with the same effect. Hence the entire film is translucent or transparent serving in adjoining minute spots to project or diverge the light rays as they are admitted therethrough to the negative photographic plate.

The number of concavities and convexities contained within any predetermined space will control the texture of the stipple effect produced thereby, by increasing the number of contrasting dots in said space, thus reducing the size of the dots and increasing their number.

To avoid the presence of a design upon the film which design will be reproduced to a certain extent upon the sensitized plate, I arrange this surface irregularly, alternating concavities and convexities, however, as above described, thus avoiding a similar design throughout the entire plate and producing an effect similar to the ordinary stippling. This irregular arrangement is clearly illustrated in Fig. 1. This plate so made becomes a master plate and the design thereof and the tone of this design may be reproduced upon a plate having a light sensitive film, photographically to produce succeeding plates.

In using the screen several practices may be followed. It may be used as the ordinary ruled screen, that is, mounted within a camera so as to concentrate portions of the light rays passing from the lens through the screen to the sensitized plate. This plate, however, differing from the manner of use of the ruled screen, may be used with any parallel rays of light either natural or artificial, to print directly from a negative upon a sensitized metallic plate, by interposing a screen at the proper focal distance between the negative and the light or between the negative and the sensitized plate. This adaptability to this use is due entirely to the fact of the lenticular effect of the alternate concavities and convexities in the screen, which, when it is placed at the proper focal distance from the sensitized plate, act as a multitude of small lenses to concentrate the light rays and pass them through the negative in variable volume at different points upon the sensitized plate thus setting the sensitizing agent upon said plates in the same manner as with an ordinary photographic plate upon a sensitized paper.

The absence of opaque lines in my improved screen permits a greater volume of light to pass through the screen than is possible with a semi-opaque screen; and hence, the contrast in the imprint made from a printing surface produced by means of a screen will be sharper. If a screened negative be made, contrasts in this negative will be sharper. This is probably due to the fact that a shorter exposure is required when using my improved screen than is required when using a semi-opaque screen.

In producing the first, or master, plate, a transparent support, as a plate of glass, is coated with ordinary gelatin in the usual manner employed in coating photographic dry plates. No chemicals need be mixed with the gelatin; and the best results have been secured by the use of pure gelatin. This plate is then submerged in a warm solution containing chromic acid, tannic acid, formaldehyde, bromid of potassium or any equivalent astringent which will have the effect of contracting or "tanning" the gelatin. The solution may vary in temperature from 90 to 145 degrees Fahrenheit, good results having been secured at both these temperatures and at many intermediate temperatures. When the gelatin has been contracted or "tanned" to the desired extent, which is determinable only by a sense of feeling, developed by experience, the plate is removed from the astringent bath; washed with clear water to arrest the action of the astringent, and dried under a gentle heat.

It has been found that the astringent used and the temperature of the bath vary with the different plates, and that the texture of succeeding plates will vary when treated under identical conditions. In fact, the production of the plate does not seem susceptible to reduction to a fixed rule either as to the astringent or as to the temperature. This erratic action of the gelatin, under treatment, is attributed to different qualities or conditions present in different lots of gelatin. Good results have been secured when a large number of plates were coated with the same lot of gelatin, and the best treatment for the lot of plates determined by experimentation with a few of them. In fact, so many conditions arise, such as the age of the plates, the climatic conditions, the thickness of the gelatin, variations in such thickness on a plate, slight variation of temperature of the bath and even the degree of purity of the astringent used, all of which necessitate a change in the treatment of the coated plate, that the skill of the workman is required to adapt the treatment to the varying conditions. Under the most favorable conditions, the number of perfect plates have not exceeded 10 per cent. of those treated, and with plates above 14x17 inches, the percentage is even lower because of a lack of uniformity in the action of the astringent throughout the entire surface of the gelatin. The time of treatment will vary with the strength of the solution, the temperature of the bath and other conditions, the exact nature of which cannot be determined. At times a plate will respond within a minute, while at other times several minutes are required. At times, of two plates treated under the same conditions, one following the other, one will respond quickly, while the other will require a much longer time. The action of the astringent is erratic, and the nature of plates produced is also erratic. No fixed law for producing a plate of a given texture can possibly be laid down.

With my improved screen an ordinary photographic negative, as $g$ in the drawings, is placed upon or in close juxtaposition to the sensitized printing surface indicated at $h$, as a metal plate and a screen interposed at the proper distance from the printing surface to focus each of the lens-like formations of the screen upon said surface. All of these lens-like formations being substantially the same, the screen is always used at a certain distance from the printing surface, which is its screen distance. Different artistic effects may be secured by using the screen at a distance where it will be slightly out of focus or in focus. The plate is then exposed to light, either through a camera lens or to parallel rays. The light passing through the screen will penetrate the transparent or translucent tones of the negative, the rays focused by each lens like formation, setting the sensitizing agent upon the printing surface and thus preventing the etching of this portion and producing a sharp black dot varying in size with the volume of light passing through the negative, the light tones in the negative producing a number of closely juxtaposed high dots upon the sensitized printing surface, which dots will be separated by wavy, depressed, irregular lines. Where the tones on the negative are very light these dots will run together to a certain extent into wavy high lines and where the tones on the negative are darker, less light will be permitted to penetrate and there will be a proportioned diminishment in the size and number of the high dots with the broadening of the intervening depressed wavy lines. The tones of the negative are thus preserved on the printing surface, the subsequent treatment of the printing surface removing said surface where the sensitizing agent was not set, in the usual and well known manner. The high dots upon the printing surface, which will constitute the surfaces thereof to be inked will vary in their size and number and the length and thickness of the depressed wavy lines separating these dots, will also vary to the same extent and this variance will be controlled not by the screen itself but by the tones of the negative or of the subject being reproduced. Hence while to a certain extent the pattern of the screen will appear upon the plate, nevertheless, it will never be the same in any two plates and will loose that characteristic of a well defined design which is apparent even to the naked eye in the ruled or lined screen.

With screens made in accordance with my invention, it is possible to print a sensitized printing surface directly from the negative of a snap-shot photograph, as well as from a positive taken therefrom. Furthermore, the artistic characteristics of the ordinary negative are not lost through a reproducing process and in printing upon the sensitized printing surface. The transparent nature of my screen in its entirety permits an increase in volume of light passing therethrough as compared with semi-opaque screens to an extent to secure a clear reproduction or print from the negative with a short exposure and a more accurate tone rendering. A further advantage is that those portions of the screen which deflect the light, in printing direct, result in depressions in the sensitized plate of a character to intensify the shadows in the prints therefrom and subordinate the screen effects to the tones of the negative. A still further advantage is that by reason of the screen itself having a lenticular effect, or a focus co-inciding with its screen distance, diffusion of the light passing through the screen and a negative in printing the sensitized printing surface is obviated, thus having a strong tendency to make the etched printing surface sharper than an original printed from the negative itself. It will be observed that with this printing surface the steps incidental to making a screened negative, are eliminated as with an original negative, a photo-engraved printing surface may be produced without the aid of a camera and with a resultant reduction in the time required in making the photo-engraved plate.

It is not my intention to limit the invention to the precise detailed construction of the plate as shown in the accompanying drawings, it being apparent that such may be modified without departing from the spirit and scope of the invention. I believe it to be broadly new to provide a screen for photo-engraving work having therein no opaque surfaces and a surface adapted to focus light passed therethrough upon the sensitized plate and I intend to claim such broadly.

Having described the invention, what I claim as new, and desire to have protected by Letters Patent, is:—

1. As a new article of manufacture, a photographic screen for half-tone work, embodying therein a transparent film having minute irregularly disposed, adjoining, dissimilar, lens-like surface formations, whereby light rays will be refracted into and focused by alternate formations, to produce a stippled effect upon a sensitized surface.

2. As a new article of manufacture, a photographic screen for half-tone work, embodying therein a transparent film having irregularly disposed minute curved surface formations whereby light rays will be focused through alternate surface formations to produce a stippled effect upon a sensitized surface.

3. As a new article of manufacture, a photographic screen for half-tone work embodying therein a transparent support and a transparent film thereon having irregularly disposed minute curved surface formations, whereby light rays will be focused through alternate surface formations to produce a stippled effect upon a sensitized surface.

4. As a new article of manufacture, a photographic screen for half-tone work, embodying therein a transparent film having therein a plurality of irregularly disposed minute convex surface formations, whereby light rays will be focused at a plurality of closely juxtaposed points upon a sensitized surface to produce a stippled effect.

5. As a new article of manufacture, a photographic screen for half-tone work, embodying therein a transparent film having therein a plurality of irregularly disposed closely juxtaposed alternate minute concave and convex surface formations, whereby light rays will be refracted into and focused by alternate formations to produce a stippled effect upon a sensitized surface.

6. As a new article of manufacture, a photographic screen for half-tone work, embodying therein a transparent support and a transparent film thereon, said film having therein a plurality of irregularly arranged, minute convex surface formations whereby light rays will be focused at a plurality of closely juxtaposed points upon a sensitized surface to produce a stippled effect.

7. As a new article of manufacture, a photographic screen for half-tone work, embodying therein a transparent support and a transparent film thereon, said film having therein a plurality of closely juxtaposed alternate irregularly arranged, minute lens-like surface formations, whereby light rays will be refracted into and focused by alternate formations to produce a stippled effect upon a sensitized surface.

8. As a new article of manufacture, a photographic screen for half-tone work, embodying therein a transparent support and a transparent film having therein a plurality of minute, closely juxtaposed, irregularly disposed curved surface formations, whereby light rays will be focused by alternate surface formations to produce a stippled effect upon a sensitized surface, and a transparent protecting sheathing for said film.

9. As a new article of manufacture, a photographic screen for half-tone work, embodying therein a transparent film having therein a plurality of minute, irregularly arranged convex surface formations whereby the light rays will be focused at a plurality of closely juxtaposed points upon a sensitized surface to produce a stippled effect, and a transparent protecting sheathing for said film.

10. As a new article of manufacture, a photographic screen for half-tone work comprising a transparent plate having a surface composed of a plurality of irregularly arranged minute lens-like surface formations, whereby light rays will be refracted into and focused by alternate formations to produce a stippled effect upon a sensitized surface.

11. A half-tone screen comprising a film having a surface formed with irregularly disposed reversely curved portions constituting a pattern dissimilar in different portions thereof, and which will refract light rays passing therethrough to produce a stippled effect upon a sensitized plate when exposed thereunder.

In witness whereof, I have hereunto affixed my signature this 18th day of June, in the presence of two witnesses.

JAMES WILLARD MORRIS.

Witnesses:
P. V. WENING,
P. FRANK SONNEK.